Sept. 26, 1933.  W. E. HUFFMAN  1,927,938
AIRCRAFT TRAINING DEVICE
Filed April 29, 1930   2 Sheets-Sheet 1
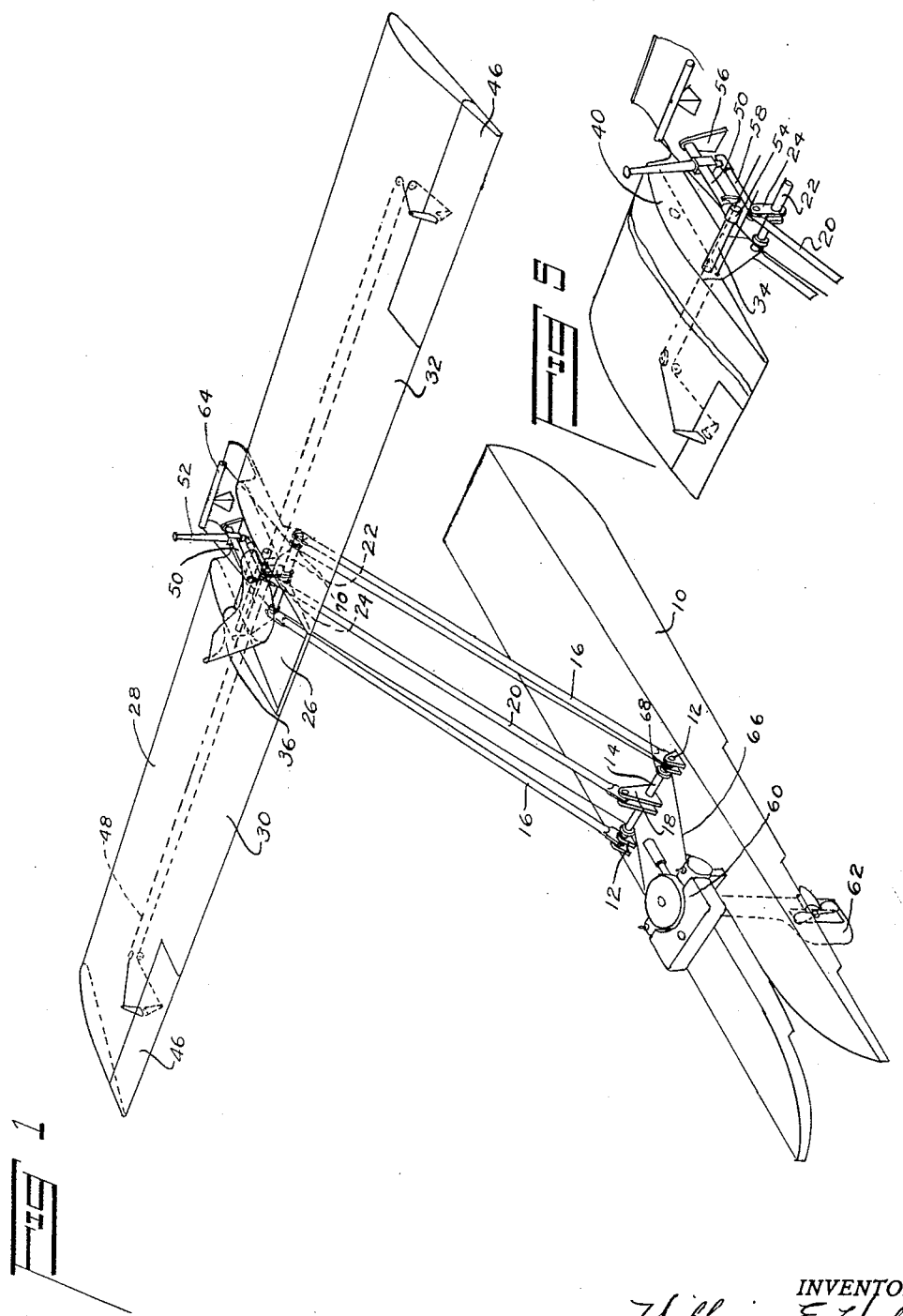
INVENTOR
William E. Huffman
BY Robert H. Young
ATTORNEY Sept. 26, 1933.                  W. E. HUFFMAN                    1,927,938
                            AIRCRAFT TRAINING DEVICE
                             Filed April 29, 1930              2 Sheets-Sheet 2
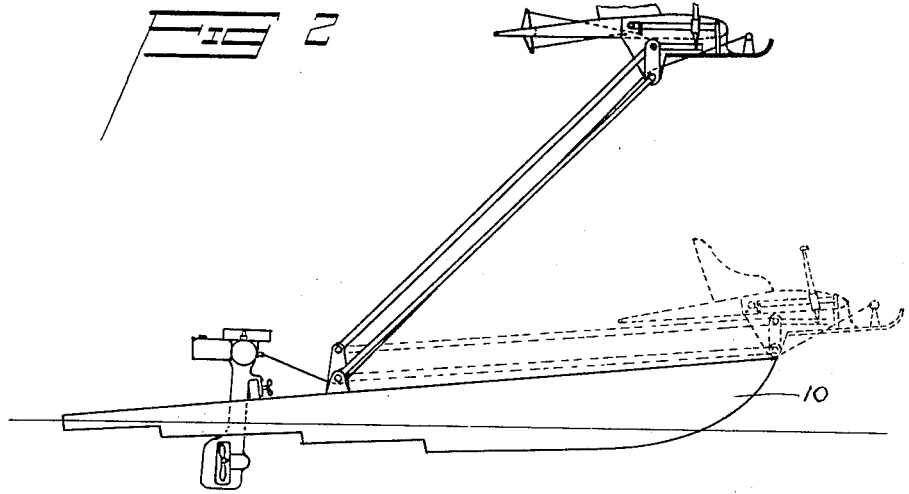
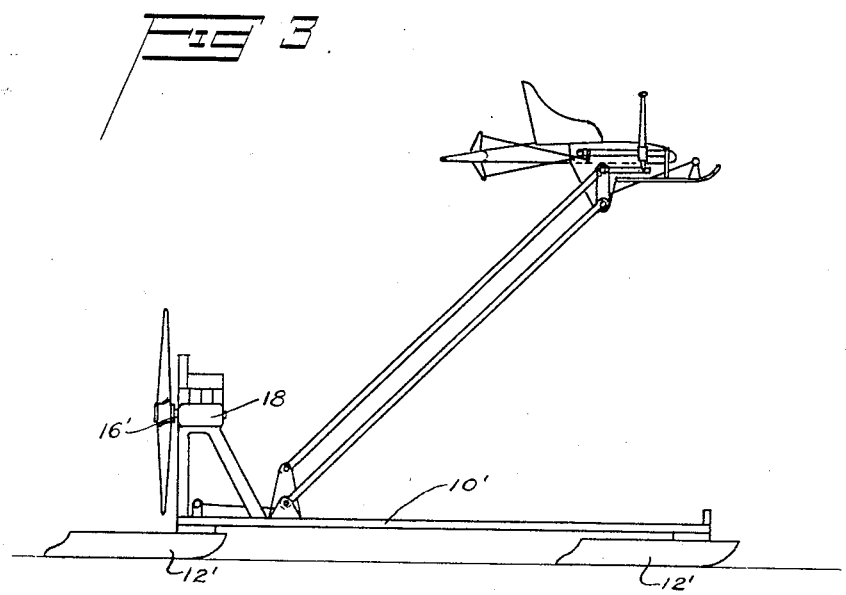
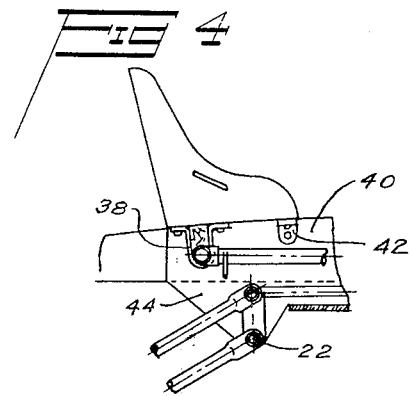
INVENTOR
BY William E. Huffman
Robert V. Young
ATTORNEY Patented Sept. 26, 1933

1,927,938

UNITED STATES PATENT OFFICE 1,927,938

AIRCRAFT TRAINING DEVICE

William E. Huffman, Dayton, Ohio

Application April 29, 1930. Serial No. 448,365

7 Claims. (Cl. 114—66.5)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to aerodynamically stable apparatus and has particular reference to a device of this character adapted to be impelled by vehicles that travel on ground, water, or ice and are adapted for use as flight teaching or amusement apparatus.

The term "vehicle" as used in claims will be construed to mean any type of land and water vehicle.

A primary object of my invention, therefore, is to provide an aerodynamic apparatus that is adapted to be supported in the air by aerodynamic forces applied by means of the forward movement of a vehicle to which it is connected and which vehicle is either self propelled or towed.

Another object of my invention is to provide in an apparatus of this character a supporting surface that is adapted to be controlled by the student to assume various angles of attack relative to its supporting medium and attitudes relative to the vehicle.

A further object of my invention is to provide in a device of this character means for limiting the movements of the supporting surface.

A still further object of my invention is to provide in a device of this character a tiltable wing and control means carried by said wing whereby its angle of attack may be varied by the operator at will.

It will of course be apparent that any form of traveling device or vehicle capable of moving on a stable medium such as water, ice, ground, soil, etc., and of attaining the necessary rate of speed, whether it be accomplished by its own power or by external forces, may be utilized in connection with the aerodynamic apparatus, as a support and as an impelling medium therefor, and through suitable connecting mechanism therewith will permit the same to assume various positions and attitudes about a fixed reference.

In the accompanying drawings:

Figure 1 is a perspective view of my aircraft training device.

Figure 2 is a side elevation of the same.

Figure 3 is a side elevation showing a modification of my device.

Figure 4 is a fragmentary view of a detail of construction.

Figure 5 is a fragmentary perspective view illustrating the construction of the control mechanism.

As shown in Figs. 1 and 2 a boat 10 of well known construction is adapted for this purpose by fixedly attaching thereto, in any suitable manner, a pair of special fittings 12 that are disposed in transverse alignment with respect to the boat and are rigidly connected together by means of a cross rod 14. The cross rod serves also as a pivot for the arms 16 and as a support for the vertically disposed fixed link 18, to which an arm 20 is pivotally connected at one end. These arms 16 and 20 are similarly connected at their opposite ends to a cross rod 22 and link 24 respectively to provide a parallelogram linkage arrangement. The link 24, however, being free to pivot at both ends, thereby permits the parallelogram linkage to be moved angularly relative to the boat, its upward movement being determined by the length of the arms 16 and 20 and its angular movement by the length of the links 18 and 24.

An aerodynamic apparatus or glider comprising a support 26 for a person and means to control the attitude of said apparatus in flight, is pivotally connected to the cross rod 22 so that it is balanced upon or slightly forward of the center of pressure of airfoil 28 at a predetermined angle of attack and is adapted normally to rest upon the forward end of its supporting vehicle.

In the illustration best shown in Fig. 1, this apparatus is in the form of an airfoil 28 and is provided at its mid section with the car or support 26 in which the student or pilot is seated for maneuvering the same. In accordance with the design disclosed the said apparatus is constructed from two similar airfoil sections 30 and 32 that are jointed on opposite sides of the car 26 and are fixedly secured relative to each other and to the car by means of a tubular metallic spar member 34. This spar member forms the central spar for both airfoil sections and also serves as a support for a seat 36 that is connected thereto at its rear end by means of U-clamps 38, the forward end of the seat being attached to the sides or gusset plates 40 of the car by means of brackets 42.

The hull of the car may be made from any suitable strong material and in any convenient manner and as illustrated in Fig. 4 is constructed from steel metal that is stamped to provide, when bent upon the lines, the pair of sides or gusset plates 40 which as heretofore stated are connected to the inner ends of the wing section by means of bolts and nuts (not shown) and a pair of spaced brackets 44 for connecting the car to the opposite ends of the cross rod 22.

The lateral stability of the apparatus is maintained in the usual and well known manner by providing a pair of ailerons 46 that are positioned at the rear outward ends of the wing sections and are connected by a cable 48 and a rod 50 to a lever or "joy stick" 52. This control lever is attached intermediate of its ends to the rod 50 in such manner that it is capable of pivoting about an axis at right angles to the longitudinal axis of the rod, but is angularly rotatable with the rod. The spar 34 has a fitting 54 connected thereto which serves as a support for one end of the rod 50 and a bracket 56, stamped and bent upward from the bottom of the hull, serves as a support for the other end of the rod 50.

The longitudinal stability of the apparatus is maintained by tilting the same about the cross rod 22. Any suitable mechanism may be used for this manner of control and as shown on Fig. 5 of the drawings the mechanism utilized consists of a rod 58 that is pivotally connected at one end to the upper end of the link 24 and at its other end to the lower end of the control lever. The cross rod 22 being relatively fixed with respect to the lever 52 any forward or rearward movement of the lever will respectively increase or decrease the angle between the rod 22 and the lever 52 with a consequent lowering or raising respectively of the forward or leading edge of the wing.

The operation of the device above described is as follows:

When sufficient forward speed of the boat 10 is attained by means of the outboard motor 60 affixed thereto in the usual and well known manner, the apparatus together with the supported person will be bodily aerodynamically lifted, in the plane in which the parallelogram linkage is disposed, a predetermined height and about a predetermined angle depending of course upon the parallelogram linkage arrangement. Through the use of the control lever, which is capable of a limited fore and aft movement, the student or pilot can slightly change the angle of attack of the glider and this by an aft movement of lever 52 the wing 28 is tilted upward thereby increasing the angle of attack and causing a more rapid elevation of the apparatus. Should the student desire to retard the upward movement when elevating or to lower the apparatus when elevated a slight forward movement of the control lever will produce a negative angle of incidence and the resultant pressure of the airstream against the wing surface will cause a lowering of the same. The lateral stability as well as the elevational movement of the apparatus is accomplished in a manner well known in the art. The lateral stability is maintained by means of the ailerons which are controlled by a lateral movement of the control lever, whereas the directional movement is controlled by controlling the boat through a rudder 62 attached to the boat, a rudder bar 64 connected to the car and a cable 66 passing over pulleys 68 on rod 14 and pulleys 70 on rod 22 for interconnecting the rudder and rudder bar.

Any form of glider may be substituted for the apparatus above described without departing from the spirit of my invention and where the substituted glider is provided with elevators, tilting of the wing may be dispensed with. Directional control during the forward movement of the apparatus may also be obtained by attaching a rudder to the glider instead of to the vehicle as shown.

In the embodiment shown in Fig. 3 the aerodynamic apparatus is identical in construction to that shown in Fig. 1, but it is shown supported upon a sled 10 provided with runners 12. This sled is steerable in a manner similar to that above described, the rear runner acting as a dirigible element, and is propelled forward by means of a pusher propeller 16 rotated by the motor affixed to the sled.

I claim:

1. An aerodynamic apparatus comprising, a support for a person, control surfaces for changing the attitude of said apparatus, means for controlling said surfaces, and means for connecting said apparatus to a powered vehicle and for maintaining the longitudinal axis of said apparatus in a predetermined relationship to said vehicle as said apparatus is bodily lifted by the forward movement of said vehicle.

2. An aerodynamic apparatus comprising, a support for a person, control surfaces for changing the attitude of said apparatus, means for controlling said surfaces, and link mechanism for connecting said apparatus to a powered vehicle to be moved therewith, being so constructed and arranged that said apparatus may be bodily aerodynamically lifted angularly relative to said vehicle as it is moved forward, said vehicle and said link mechanism comprising means for maintaining said apparatus at substantially a normal angle of attack while ascending, said link mechanism and said control means operatively connected for changing the angle of attack of said apparatus at will.

3. An aerodynamic apparatus comprising, a support for a person and mechanical means for connecting the same to a vehicle, said means comprising a parallelogram linkage so constructed and arranged that said apparatus may be moved bodily in a fixed plane at a fixed angle of attack relative to said vehicle while said vehicle is moving forward.

4. The combination with a vehicle having a prime-mover of a glider connected thereto and bodily movable about a fixed point with respect to said vehicle and means for maintaining a longitudinal axis of said glider in a predetermined relationship to the longitudinal axis of said vehicle as said glider is moved about said reference.

5. The combination with a vehicle, of a glider pivotally connected and normally supported, to and by, said vehicle, comprising a support for a person, control surfaces, means for controlling said surfaces, and means interconnecting said glider and vehicle, said means including a parallelogram linkage arrangement for limiting the bodily upward movement of said glider and for maintaining said glider at a predetermined angle of attack.

6. An aerodynamic apparatus comprising, a support for a person, control surfaces for changing the attitude of said apparatus, means for controlling said surfaces, and link mechanism for connecting said apparatus to a powered vehicle to be moved therewith being so constructed and arranged that said apparatus may be bodily aerodynamically lifted angularly relative to said vehicle as it is moved forward by said vehicle, said link mechanism automatically maintaining said apparatus at a predetermined angle of attack while ascending.

7. The combination with a vehicle, of a glider pivotally connected and normally supported, to and by, said vehicle, comprising a support for a person, control surfaces, means for controlling said surfaces, and means interconnecting said glider and vehicle so that said glider may be bodily moved relative to said vehicle in a predetermined path by the influencing forces of air when said vehicle is moving forward at a sufficient speed and automatically maintained at a predetermined angle of attack during said movement.

WILLIAM E. HUFFMAN.